July 22, 1952  J. L. ROONEY  2,604,010
EYEGLASS LENS FRAME
Filed June 15, 1950

Inventor
John L. Rooney
By *[signature]*
Attorney

Patented July 22, 1952

2,604,010

UNITED STATES PATENT OFFICE 2,604,010

EYEGLASS LENS FRAME

John L. Rooney, Chicago, Ill.

Application June 15, 1950, Serial No. 168,229

2 Claims. (Cl. 88—47)

The present invention relates to improvements in eyeglass lens frames or mounts particularly for segmental lenses such as disclosed in my copending application Serial No. 779,609, filed October 13, 1947, now Patent No. 2,570,718, dated October 9, 1951, of which the present application is a continuation-in-part.

It is an object of the invention to provide a novel lens mount which normally securely supports and protects the lens but which may be readily adapted for lens replacement when desired.

It is a more specific object to provide a multipart lens mount composed of a rigid member and an engaging arcuate spring member for confining a lens, the rigid member being provided with temple and nose piece connections for rotatably supporting the lens into any desired angular position.

Other objects and advantages of the invention will be apparent from the following detailed description taken in conjunction with the accompanying drawings wherein a preferred embodiment of the principles of the invention has been selected for exemplification.

Figure 1:
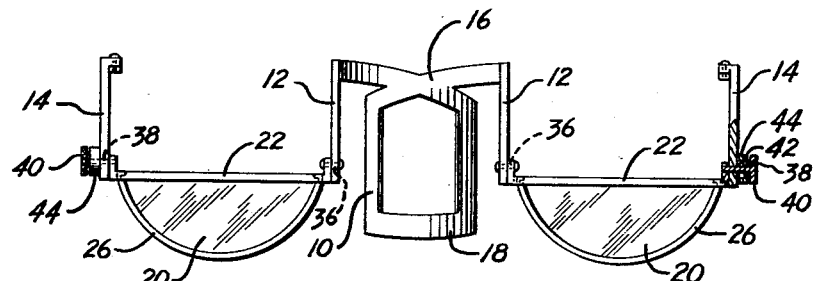
Fig. 1 is a front elevational view of eyeglasses constructed in accordance with the present invention.

Referring more particularly to the drawings, wherein like numerals refer to like parts, the lens mount supporting structure may be similar to that of my prior application Serial No. 779,609, filed October 13, 1947, now Patent No. 2,570,718, issued October 9, 1951, and as shown in Fig. 1 comprises a connecting bridge 10, upright posts 12 integral with opposed side thereof and a temple post 14 cooperating with each upright post. Connecting bridge 10 is preferably formed with upper and lower horizontal portions 16 and 18, respectively, for engaging the nose of the user at vertically spaced points to provide a secure brace when the lens mounts are rotatably adjusted as will be hereinafter described.

Figure 2:
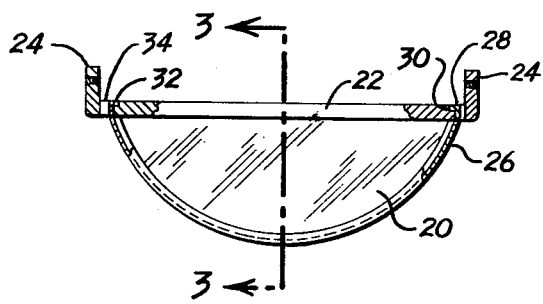
Fig. 2 is an enlarged elevational view partly in section on one of the lens mounts shown in Fig. 1.
Figure 3:
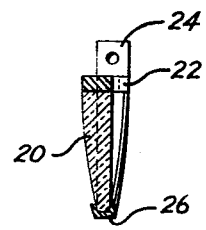
Fig. 3 is a vertical sectional view taken on the line 3—3 of Fig. 2.
Figure 4:
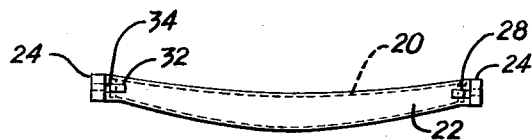
Fig. 4 is a plan view of the lens mount shown in Figs. 2 and 3.

Coming now to the novel features of the present invention, the frames or mounts for the lenses 20 comprise a horizontally disposed rigid bar 22 having upturned ears 24 integral with each extremity. An arcuate resilient member 26 is channel-shaped in cross section to receive the arcuate lower portion of the lens 20. Resilient member 26 is provided at one extremity with a reduced portion forming a laterally bent pin 28 which normally seats in a recess 30 countersunk in the bar 22, as best shown in Fig. 2. The opposed extremity of member 26 is provided with a reduced portion forming a somewhat shorter laterally bent pin 32 which is received in a slot 34 countersunk in the bar 22.

Figure 5:
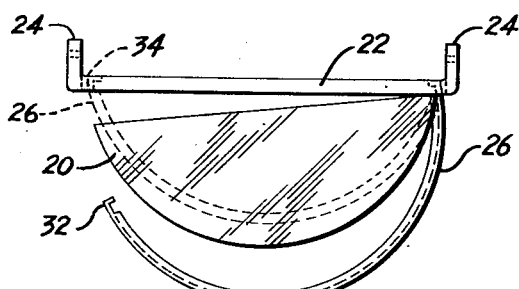
Fig. 5 is an elevational view similar to Fig. 2 but showing the parts disconnected for lens removal or replacement.

The resiliency or inward spring action of arcuate member 26 is sufficient firmly to secure the same to the bar 22 when the pin 28 is inserted in the slot 30. The bar and arcuate member may be separated for lens replacement, as shown in Fig. 5, by urging the pin 32 slightly outwardly in the slot 34 with the finger nail or any suitable pointed instrument.

For supporting the lens mounts for pivotal adjustment each of the ears 24 is transversely bored, one to receive a spindle 36 for connection with the lower extremity of post 12 and the other to receive a spindle 38 for connection with the lower extremity of opposed temple post 14. Each spindle 38 is provided with a knurled nob 40 for pivotally turning the lens frames in any desired angular position and for maintaining the frames in such position coiled springs 42 are disposed axially of the spindles 38 within the sleeves 44 to bear against the adjacent faces of posts 14 and nobs 40.

The construction and arrangement of the eyeglasses of the present invention are such that the lenses 20 may be adjusted in any angular position convenient to the user for downward vision as when reading or horizontal vision as when reading wall maps or the like, the lenses in either their lowermost or uppermost positions being always in a line of vision of the user. The lenses 20 preferably are sections of normal sized elliptical lenses such as would be formed by drawing a chord at or below the medial portion of an ordinary lens. In their most desirable form the lenses 20 are approximately one-third normal lens area, as shown.

It will be understood that the present invention is not confined to the precise construction and arrangement of parts herein shown and described but embraces all modifications thereof coming within the scope of the following claims.

I claim:

1. A frame assembly for segmental eyeglass lenses, the said frame assembly comprising, a rigid substantially straight frame section, a resilient arcuate frame section channelled to receive the arcuate edge of a lens and cooperating means carried by said sections whereby detachably to secure the same in operative lens supporting position, the said cooperating means comprising, reduced end portions on said resilient frame section forming laterally bent pins, countersunk slots at each end portion of said rigid frame section on the side thereof remote from the lens, communicating bores for said slots extending through said rigid frame section to the opposite lens side thereof and of sufficient width to permit passage of the reduced end portions of said resilient frame section so that said laterally bent pins seat in said slots whereby to overlie portions of said rigid frame section detachably to secure the said sections together.

2. The frame assembly of claim 1 wherein the resilient arcuate frame section is inwardly sprung and the end pins are inwardly bent.

JOHN L. ROONEY.

REFERENCES CITED

The following references are of record in the file of this patent:

UNITED STATES PATENTS

| Number | Name | Date |
|---|---|---|
| 1,988,646 | Dirr | Jan. 22, 1935 |
| 2,277,118 | Leavitt | May 24, 1942 |
| 2,329,100 | Chappell | Sept. 7, 1943 |
| 2,512,011 | Crane | June 20, 1950 |

FOREIGN PATENTS

| Number | Country | Date |
|---|---|---|
| 549,198 | Great Britain | Nov. 10, 1942 |
| 914,794 | France | July 1, 1946 |